United States Patent
Quach et al.

(10) Patent No.: US 11,143,038 B2
(45) Date of Patent: Oct. 12, 2021

(54) GAS TURBINE ENGINE HIGH LIFT AIRFOIL COOLING IN STAGNATION ZONE

(71) Applicant: UNITED TECHNOLOGIES CORPORATION, Hartford, CT (US)

(72) Inventors: San Quach, East Hartford, CT (US); Matthew A. Devore, Cromwell, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 682 days.

(21) Appl. No.: 14/767,768

(22) PCT Filed: Feb. 26, 2014

(86) PCT No.: PCT/US2014/018550
§ 371 (c)(1),
(2) Date: Aug. 13, 2015

(87) PCT Pub. No.: WO2014/137686
PCT Pub. Date: Sep. 12, 2014

(65) Prior Publication Data
US 2016/0010463 A1    Jan. 14, 2016

Related U.S. Application Data

(60) Provisional application No. 61/772,431, filed on Mar. 4, 2013.

(51) Int. Cl.
*F01D 5/18* (2006.01)
*F02C 3/04* (2006.01)
*F02C 7/18* (2006.01)

(52) U.S. Cl.
CPC ............. *F01D 5/186* (2013.01); *F01D 5/187* (2013.01); *F02C 3/04* (2013.01); *F02C 7/18* (2013.01);
(Continued)

(58) Field of Classification Search
CPC . F01D 5/14; F01D 5/141; F01D 5/142; F01D 5/143; F01D 5/18; F01D 5/183;
(Continued)

(56) References Cited

U.S. PATENT DOCUMENTS 5,374,162 A * 12/1994 Green .................... F01D 5/186
415/115
7,114,923 B2 * 10/2006 Liang .................... F01D 5/187
416/97 R
(Continued)

OTHER PUBLICATIONS

Zhang, X F, Unsteady boundary layer studies on ultra-high-lift low-pressure turbine blades, Apr. 11, 2005, Whittle Laboratory University of Cambridge (Year: 2005).*
(Continued)

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

An airfoil for a gas turbine engine includes pressure and suction side walls joined to one another at leading and trailing edges. A stagnation line is located on the pressure side wall aft of the leading edge. A cooling passage is provided between the pressure and suction side walls. Forward-facing cooling holes are provided adjacent to the stagnation line on the pressure side wall and oriented toward the leading edge.

16 Claims, 3 Drawing Sheets

(52) U.S. Cl.
CPC ...... *F05D 2220/32* (2013.01); *F05D 2240/30* (2013.01); *F05D 2240/35* (2013.01); *F05D 2260/202* (2013.01); *Y02T 50/60* (2013.01)

(58) Field of Classification Search
CPC ............... F01D 5/186; F05D 2240/301; F05D 2240/303; F05D 2240/304
See application file for complete search history.

(56) References Cited

U.S. PATENT DOCUMENTS

| | | | |
|---|---|---|---|
| 7,220,100 | B2 | 5/2007 | Lee et al. |
| 7,581,928 | B1 | 9/2009 | Cunha |
| 8,087,893 | B1 | 1/2012 | Laing |
| 8,206,115 | B2 | 6/2012 | Gupta et al. |
| 8,281,604 | B2 | 10/2012 | Broomer et al. |
| 2004/0081548 | A1 | 4/2004 | Zess et al. |
| 2005/0079060 | A1* | 4/2005 | MacManus ............. F01D 5/141 416/235 |
| 2005/0089394 | A1* | 4/2005 | Lu ............................ F01D 5/186 415/115 |
| 2005/0111976 | A1 | 5/2005 | Lee |
| 2007/0128029 | A1* | 6/2007 | Liang ..................... F01D 5/186 416/97 R |
| 2008/0095622 | A1 | 4/2008 | Naik et al. |
| 2009/0317227 | A1* | 12/2009 | Grover ................... F01D 5/141 415/1 |
| 2010/0040478 | A1* | 2/2010 | Abdel-Messeh ........ F01D 5/187 416/97 R |
| 2010/0254801 | A1* | 10/2010 | Tibbott ................... F01D 5/186 415/115 |

OTHER PUBLICATIONS

Bill Gunston, Janes Aero-Engines, 2000, DPA, Issue 7 (Year: 2000).*
Talya, S.S., Multidisciplinary Analysis and Design Optimization Procedure for Cooled Gas Turbine Blades, 2000 (Year: 2000).*
International Search Report and Written Opinion for PCT Application No. PCT/US2014/018550, dated Jun. 27, 2014.
International Preliminary Report on Patentability for International Application No. PCT/US2014/018550 dated Sep. 17, 2015.
Extended European Search Report for European Application No. 14760123.1 dated Sep. 12, 2016.

* cited by examiner

GAS TURBINE ENGINE HIGH LIFT AIRFOIL COOLING IN STAGNATION ZONE

STATEMENT REGARDING FEDERALLY SPONSORED RESEARCH OR DEVELOPMENT

This invention was made with government support under contract number N00019-12-D-0002-4Y01 awarded by the United States Navy. The government has certain right in the invention.

BACKGROUND

This disclosure relates to a gas turbine engine airfoil. More particularly, the disclosure relates to a cooling configuration in a stagnation zone of a high lift airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

As the demand for gas turbine thrust and efficiency increases, the rotor inlet temperatures into the turbine increases. The airfoils which extract work from the combustion gases require cooling to prevent damage. Many blades and vanes, blade outer air seals, turbine platforms, and other components include internal cooling passages that communicate cooling fluid to exterior surfaces through cooling holes to reduce surface temperatures.

A "high lift" airfoil design is an airfoil shape that allows for reduced airfoil count due to its ability to extract more work than a conventional airfoil. High lift airfoils provide an improvement in efficiency and weight reduction. In using a high lift design, the airfoil stagnation point is shifted from the leading edge nose, where it is located on a conventional airfoil, to the pressure side towards the tip. In addition, the suction side gage line, in which the gas Mach number is at the greatest, on a high lift airfoil occurs much closer to the leading edge nose than a conventional airfoil.

Placing film cooling holes on or after the gage line provides a large aerodynamic efficiency penalty due to the mixing losses incurred by injecting the cooling flow into the mainstream, which makes providing sufficient cooling for the suction side tip difficult. Current high lift airfoil cooling hole designs are the same as conventional airfoils. The cooling holes are aimed towards the aft-side, or trailing edge, and are never past the stagnation line.

SUMMARY

In one exemplary embodiment, an airfoil for a gas turbine engine includes pressure and suction side walls joined to one another at leading and trailing edges. A stagnation line is located on the pressure side wall aft of the leading edge. A cooling passage provided between the pressure and suction side walls. Forward-facing cooling holes are provided adjacent to the stagnation line on the pressure side wall and oriented toward the leading edge.

In a further embodiment of any of the above, the airfoil includes shower head cooling holes clustered about the leading edge. The forward-facing cooling holes are spaced aft of the shower head cooling holes.

In a further embodiment of any of the above, the shower head cooling holes include a cluster of three rows of holes extending in a radial direction. The three rows include a first row extending along the leading edge and second and third rows respectively arranged adjacent to and on opposing sides of the first row.

In a further embodiment of any of the above, the forward-facing cooling holes extend from a midspan of the airfoil to a tip.

In a further embodiment of any of the above, the airfoil includes aft-facing cooling holes provided adjacent to the stagnation line on the suction side wall and oriented toward the trailing edge.

In a further embodiment of any of the above, the aft-facing cooling holes are aft of the stagnation line and oriented toward a tip of the airfoil.

In a further embodiment of any of the above, the stagnation line overlaps the leading edge.

In a further embodiment of any of the above, the forward-facing cooling holes are forward of the stagnation line and oriented toward a tip of the airfoil.

In a further embodiment of any of the above, the airfoil is a high lift airfoil.

In a further embodiment of any of the above, the airfoil has a Zweifel lift coefficient of greater than 1.1.

In a further embodiment of any of the above, the airfoil is a turbine blade.

In one exemplary embodiment, a gas turbine engine includes a compressor section, a combustor fluidly connected to the compressor section, a turbine section fluidly connected to the combustor. The turbine section includes an array of turbine blades. Each turbine blade includes an airfoil having leading and trailing edges joined by spaced apart pressure and suction sides to provide an exterior airfoil surface extending in a radial direction, a stagnation line is provided on the pressure side wall aft of the leading edge. A cooling passage is provided between the pressure and suction side walls. Forward-facing cooling holes are provided adjacent to the stagnation line on the pressure side wall and oriented toward the leading edge.

In a further embodiment of any of the above, the gas turbine engine includes shower head cooling holes clustered about the leading edge. The forward-facing cooling holes are spaced aft of the shower head cooling holes.

In a further embodiment of any of the above, the shower head cooling holes include a cluster of three rows of holes extending in a radial direction. The three rows including a first row extending along the leading edge and second and third rows respectively arranged adjacent to and on opposing sides of the first row.

In a further embodiment of any of the above, the forward-facing cooling holes extend from a midspan of the airfoil to a tip of the airfoil.

In a further embodiment of any of the above, the gas turbine engine includes aft-facing cooling holes provided adjacent to the stagnation line on the suction side wall and oriented toward the trailing edge.

In a further embodiment of any of the above, the aft-facing cooling holes are aft of the stagnation line and oriented toward a tip of the airfoil.

In a further embodiment of any of the above, the stagnation line overlaps the leading edge.

In a further embodiment of any of the above, the forward-facing cooling holes are forward of the stagnation line and oriented toward a tip of the airfoil.

In a further embodiment of any of the above, the turbine blade has a high lift airfoil with a Zweifel lift coefficient of greater than 1.1.

BRIEF DESCRIPTION OF THE DRAWINGS

The disclosure can be further understood by reference to the following detailed description when considered in connection with the accompanying drawings wherein.

DETAILED DESCRIPTION

Figure 1:
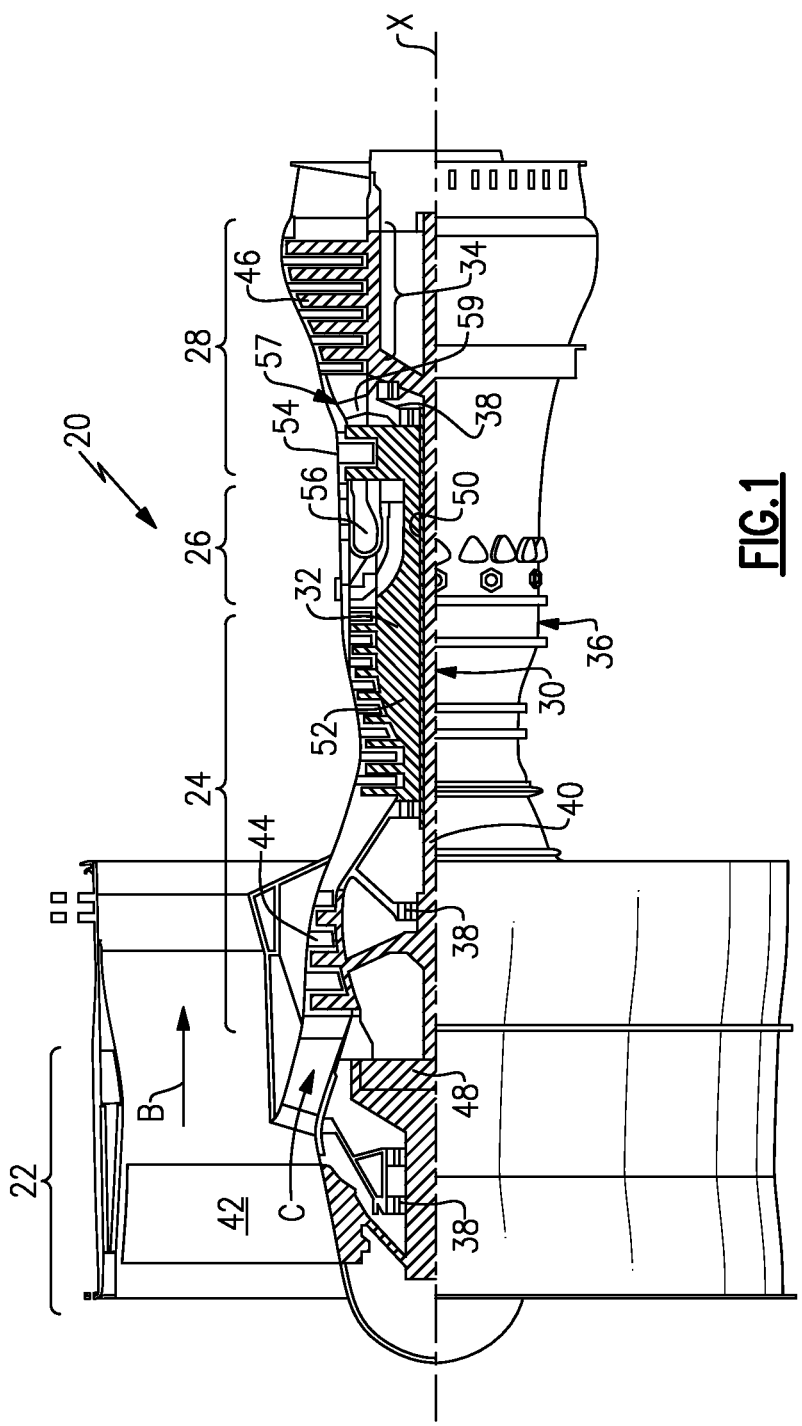
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7\ °R)]^{0.5}$. The "Low corrected fan tip speed", as disclosed herein according to one non-limiting embodiment, is less than about 1150 ft/second.

The disclosed serpentine cooling passage may be used in various gas turbine engine components. For exemplary purposes, a turbine blade 64 is described. It should be understood that the cooling passage may also be used in vanes, for example.

Figure 2A:
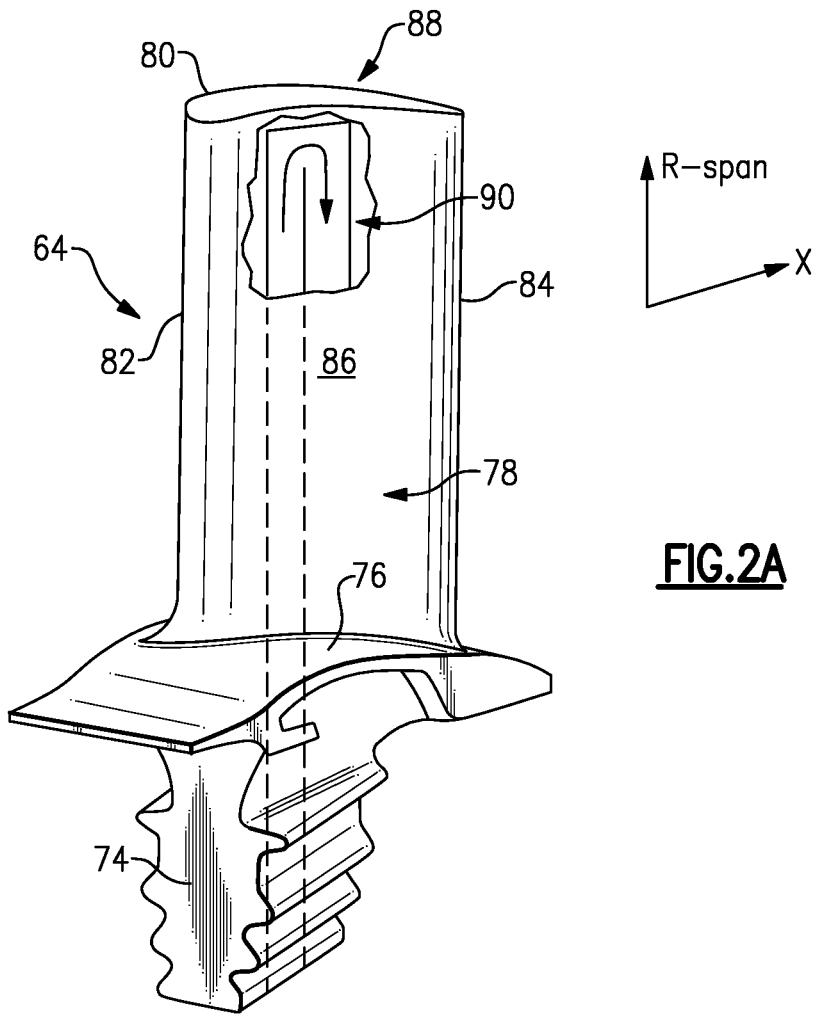
FIG. 2A is a perspective view of the airfoil having the disclosed cooling passage.
Figure 2B:
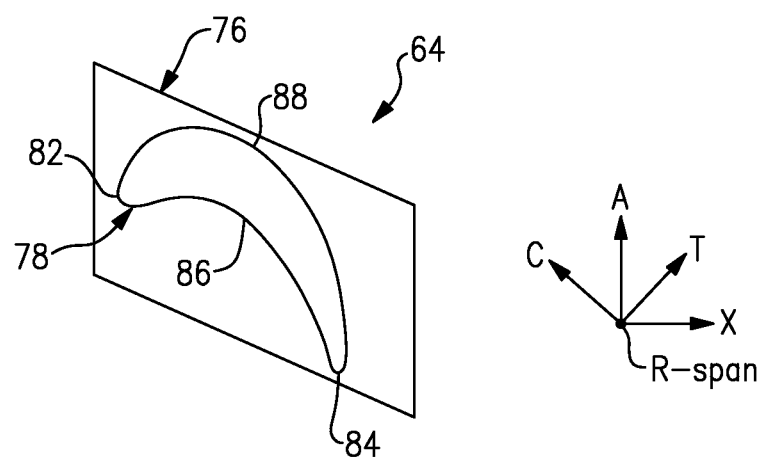
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (substantially concave) and suction (substantially convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (best shown in FIG. 3) in fluid communication with the cooling passage 90.

Figure 3:
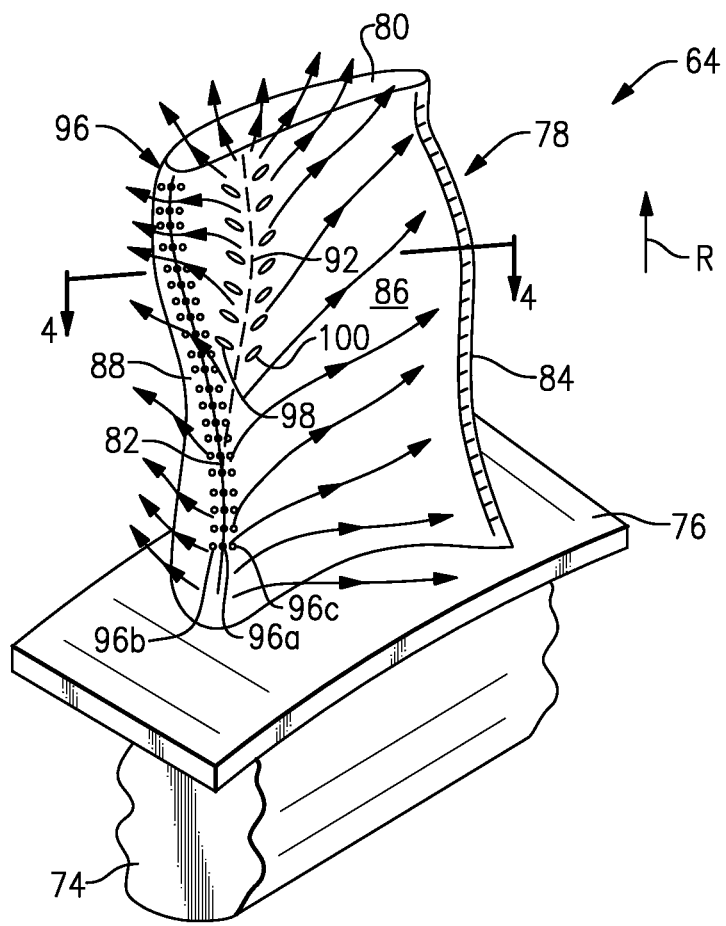
FIG. 3 is a perspective view of a high lift turbine blade illustrating the stream lines generated during engine operation.

A high lift turbine blade 64 is illustrated in more detail in FIG. 3. The streamlines are indicated by the double-arrowed lines. In one example, a high lift airfoil is defined as an airfoil with a Zweifel lift coefficient greater than 1.1. The Zweifel lift coefficient is the ratio of actual airfoil load to ideal airfoil load, as set forth in U.S. Pat. No. 7,581,930, which is incorporated by reference in its entirety.

In the example, the high lift airfoil includes a stagnation line 92 located on the pressure side wall 86 aft of the leading edge 82. In one example, the stagnation line 92 extends from a location near a mid-span of the airfoil 78 to the tip 80. The stagnation line on an airfoil is where the airfoil surface Mach number is essentially zero, meaning the static and total pressure are the same. For some high lift designs, the stagnation line shifts from the airfoil nose to the pressure side. A gage line 94 is located on the suction side wall 88 aft of the leading edge 82. The gage line on an airfoil suction side is the location where the speed is the greatest, or the minimum static pressure. On high lift airfoils, the gage line tends to shift much closer to the leading edge nose. Shower head cooling holes 96 are clustered about the leading edge 82.

In the example, the shower head cooling holes 96 include generally circular exits provided on the exterior airfoil surface. In one example, the shower head cooling holes 96 include a cluster of three rows of holes 96a-96c extending in the radial direction R. In the example, the three rows include a first row 96a extending along the leading edge 82. The second and third rows 96b, 96c are respectively arranged adjacent to and on opposing sides of the first row 96a.

Figure 4:
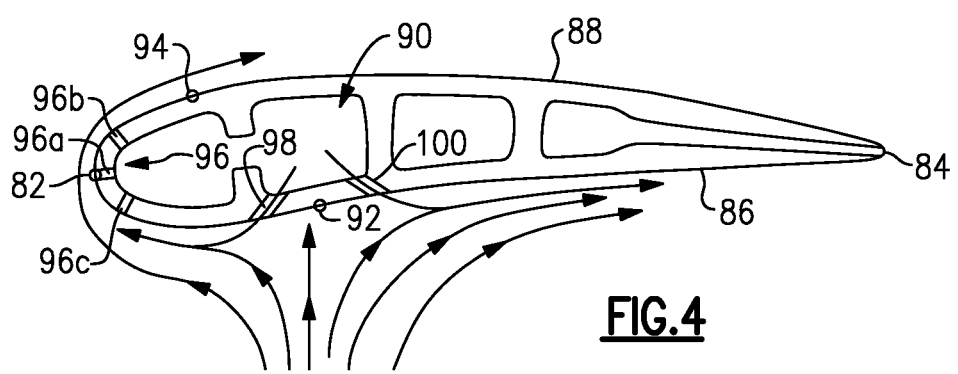
FIG. 4 is a cross-sectional view of the airfoil illustrated in FIG. 3 taken along line 4-4.

Forward-facing cooling holes 98 are provided forward and adjacent to the stagnation line 92 on the suction side wall 86 and spaced aft relative to the shower head cooling holes 96. The forward-facing cooling holes 98 are oriented toward the leading edge 82 and the tip 80. As shown by the stream lines in FIG. 4, the forward-facing cooling holes 98 encourage the flow to adhere to the airfoil exterior surface and traverse around the leading edge 82 past a gage line 94.

The gage line 94 is the location of highest velocity along the airfoil exterior surface. Since the gage line 94 is close to the leading edge 82 in a high lift airfoil, it is difficult to adhere cooling flow to the airfoil exterior surface in this area as it tends to separate, which creates a large aerodynamic efficiency penalty due to the mixing losses. The forward-facing cooling holes 98 encourage the cooling flow to adhere to the exterior airfoil surface past the gage line 94.

Aft-facing cooling holes 100 are provided aft and adjacent to the stagnation line 92 on the pressure side wall 86. The aft-facing cooling holes 100 are oriented toward the trailing edge 80 and toward the tip 80.

Although example embodiments have been disclosed, a worker of ordinary skill in this art would recognize that certain modifications would come within the scope of the claims. For example, different type and arrangements of turbulence promoting features may be used. For that and other reasons, the following claims should be studied to determine their true scope and content.

What is claimed is:

1. An airfoil for a gas turbine engine, comprising:
   pressure and suction side walls joined to one another at leading and trailing edges and forming an exterior airfoil surface extending in a radial direction to a tip, wherein a chord-wise direction extends from the leading edge to the trailing edge, a stagnation line located on the pressure side wall aft of the leading edge, a cooling passage provided between the pressure and suction side walls, and forward-facing cooling holes provided adjacent to the stagnation line on the pressure side wall and oriented toward the leading edge, a first centerline of the forward-facing cooling holes are at a first acute angle relative to a first line tangent to the exterior airfoil surface at the first centerline, the first acute angle and the first line are arranged in a first plane that extends in the chord-wise direction;
   a group of cooling holes clustered about the leading edge on both the pressure and suction side walls and distributed along a radial direction of the leading edge, the forward-facing cooling holes spaced aft of the group of cooling holes, wherein the forward-facing cooling holes are forward of the stagnation line and oriented toward the tip;
   aft-facing cooling holes provided aft of the stagnation line on the pressure side wall and oriented toward the trailing edge, a second centerline of the aft-facing cooling holes are at a second acute angle relative to a second line tangent to the exterior airfoil surface at the second centerline, the second acute angle and the second line are arranged in a second plane that extends in the chord-wise direction, the first and second acute angles are adjacent to the stagnation line; and
   wherein the airfoil has a Zweifel lift coefficient of greater than 1.1.

2. The airfoil according to claim 1, wherein the forward-facing cooling holes extend from a midspan of the airfoil to the tip.

3. The airfoil according to claim 1, wherein the aft-facing cooling holes are oriented toward the tip of the airfoil.

4. The airfoil according to claim 1, wherein the stagnation line overlaps the leading edge.

5. The airfoil according to claim 1, wherein the airfoil is a high lift airfoil.

6. The airfoil according to claim 1, wherein the airfoil is a turbine blade.

7. The airfoil according to claim 1, wherein the group of cooling holes are shower head cooling holes.

8. The airfoil according to claim 7, wherein the shower head cooling holes include a cluster of three rows of holes extending in a radial direction, the three rows including a first row extending along the leading edge and second and third rows respectively arranged adjacent to and on opposing sides of the first row.

9. The airfoil according to claim 7, wherein the shower head cooling holes provide generally circular exits provided on the exterior airfoil surface.

10. A gas turbine engine comprising:
a compressor section;
a combustor fluidly connected to the compressor section;
a turbine section fluidly connected to the combustor, the turbine section includes:
an array of turbine blades, each turbine blade includes an airfoil having leading and trailing edges joined by spaced apart pressure and suction sides to provide an exterior airfoil surface extending in a radial direction to a tip, wherein a chord-wise direction extends from the leading edge to the trailing edge, a stagnation line provided on the pressure side wall aft of the leading edge, a cooling passage provided between the pressure and suction side walls, and forward-facing cooling holes provided adjacent to the stagnation line on the pressure side wall and oriented toward the leading edge, a first centerline of the forward-facing cooling holes are at a first acute angle relative to a first line tangent to the exterior airfoil surface at the first centerline, the first acute angle and the first line are arranged in a first plane that extends in the chord-wise direction;
a group of cooling holes clustered about the leading edge on both the pressure and suction side walls and distributed along the radial direction, the forward-facing cooling holes spaced aft of the group of cooling holes, wherein the forward-facing cooling holes are forward of the stagnation line and oriented toward the tip;
aft-facing cooling holes provided aft of the stagnation line on the pressure side wall and oriented toward the trailing edge, a second centerline of the aft-facing cooling holes are at a second acute angle relative to a second line tangent to the exterior airfoil surface at the second centerline, the second acute angle and the second line are arranged in a second plane that extends in the chord-wise direction, the first and second acute angles are adjacent to the stagnation line; and
wherein the airfoil has a Zweifel lift coefficient of greater than 1.1.

11. The gas turbine engine according to claim 10, wherein the forward-facing cooling holes extend from a midspan of the airfoil to the tip of the airfoil.

12. The gas turbine engine according to claim 10, wherein the aft-facing cooling holes are oriented toward the tip of the airfoil.

13. The gas turbine engine according to claim 10, wherein the stagnation line overlaps the leading edge.

14. The gas turbine engine according to claim 10, wherein the group of cooling holes are shower head cooling holes.

15. The gas turbine engine according to claim 14, wherein the shower head cooling holes include a cluster of three rows of holes extending in a radial direction, the three rows including a first row extending along the leading edge and second and third rows respectively arranged adjacent to and on opposing sides of the first row.

16. The gas turbine engine according to claim 14, wherein the shower head cooling holes provide generally circular exits provided on the exterior airfoil surface.

* * * * *